United States Patent [19]

Schwarz

[11] 4,333,135
[45] Jun. 1, 1982

[54] FOUR QUADRANT AC AND DC TO AC AND DC CONVERTER WITH TWO OR MORE INDEPENDENTLY CONTROLLED LOADS

[76] Inventor: Francisc C. Schwarz, Round Hill Rd., Lincoln, Mass. 01773

[21] Appl. No.: 151,967

[22] Filed: May 21, 1980

[51] Int. Cl.³ ........................................... H02M 3/315
[52] U.S. Cl. .................................... 363/28; 363/136; 363/41; 363/79
[58] Field of Search ...................... 307/11, 12, 17, 38; 323/338; 363/27, 28, 79, 96, 136, 17, 41

[56] References Cited

U.S. PATENT DOCUMENTS 3,953,779  4/1976  Schwarz ............................... 363/28
4,096,557  6/1978  Schwarz ................................ 363/9

Primary Examiner—William M. Shoop
Attorney, Agent, or Firm—Frijouf, Rust & Pyle

[57] ABSTRACT

Disclosed is a class of power converter which extracts electric energy from a source of A.C. or D.C. power and conveys this energy through series resonant circuits to two or more loads in an independently controllable form.

13 Claims, 9 Drawing Figures

FOUR QUADRANT AC AND DC TO AC AND DC CONVERTER WITH TWO OR MORE INDEPENDENTLY CONTROLLED LOADS

BACKGROUND OF THE INVENTION

This invention relates to power converters, and more particularly, to a series capacitor inverter-converter.

This type of converter utilizes an internal series resonant circuit which link a source of AC or DC energy with one or more loads simultaneously. The above cited type of converter is described in detail in the literature and in my U.S. Pat. Nos. 3,953,779 and 4,096,557 issued on Apr. 27, 1976 and June 20, 1978, respectively.

One of the problem areas which arises with the use of this type of converters is the fact that the individual output voltages of the plurality of output terminal pairs depend on the time varying impedances of the loads. Accordingly, the power distribution to the plural loads may vary due to the time varying impedance of a load. The respective voltages across the loads will change whenever the impedance of a load changes and all the other loads that are connected to the single converter will change power consumption accordingly. This problem will occur even if the voltage of one of the loads is stabilized. The voltage of the loads in the impedance has undergone a change, will then vary, causing changes in other load voltages.

This behavior is due to the fact that the loads are driven by a source of electrical energy from the converter rather than a voltage source. In the case of parallel inverters each of the loads is connected to a voltage source. The advantages that have been set forth in the above referred to literature have made the use of the power converter, which employs series resonant circuits, desirable. A removal of the above described shortcoming appears necessary, in order to make this converter suitable for general use, including the feeding of two or more electric loads with independently controlled voltage or current.

SUMMARY OF THE INVENTION

This invention provides series capacitor inverter-converters with the capability to supply electric energy to two or more loads simultaneously, wherein the supply of energy can be controlled independently to each load. The purpose of this control is to allow each of the load voltages or currents follow an individual reference signal.

Accordingly it is the objective of the present invention to provide an improved systems, which employ resonant circuits for the purpose of transfer of energy from a source to two or more loads.

It is a further objective of this invention to control each of the loads connected to the series capacitor inverter-converter independently.

It is a further objective of this invention to retain a favorable electric efficiency of operation without regard to changes of the voltage of the source of energy within the design limits and without regard to controlled changes of the converters output voltages within design limits.

BRIEF DESCRIPTION OF THE DRAWINGS

The above mentioned and other objects of the invention will become apparent from the following detailed description of the invention when read in conjunction with the accompanying drawings in which.

DESCRIPTION OF THE PREFERRED EMBODIMENT

Figure 1:
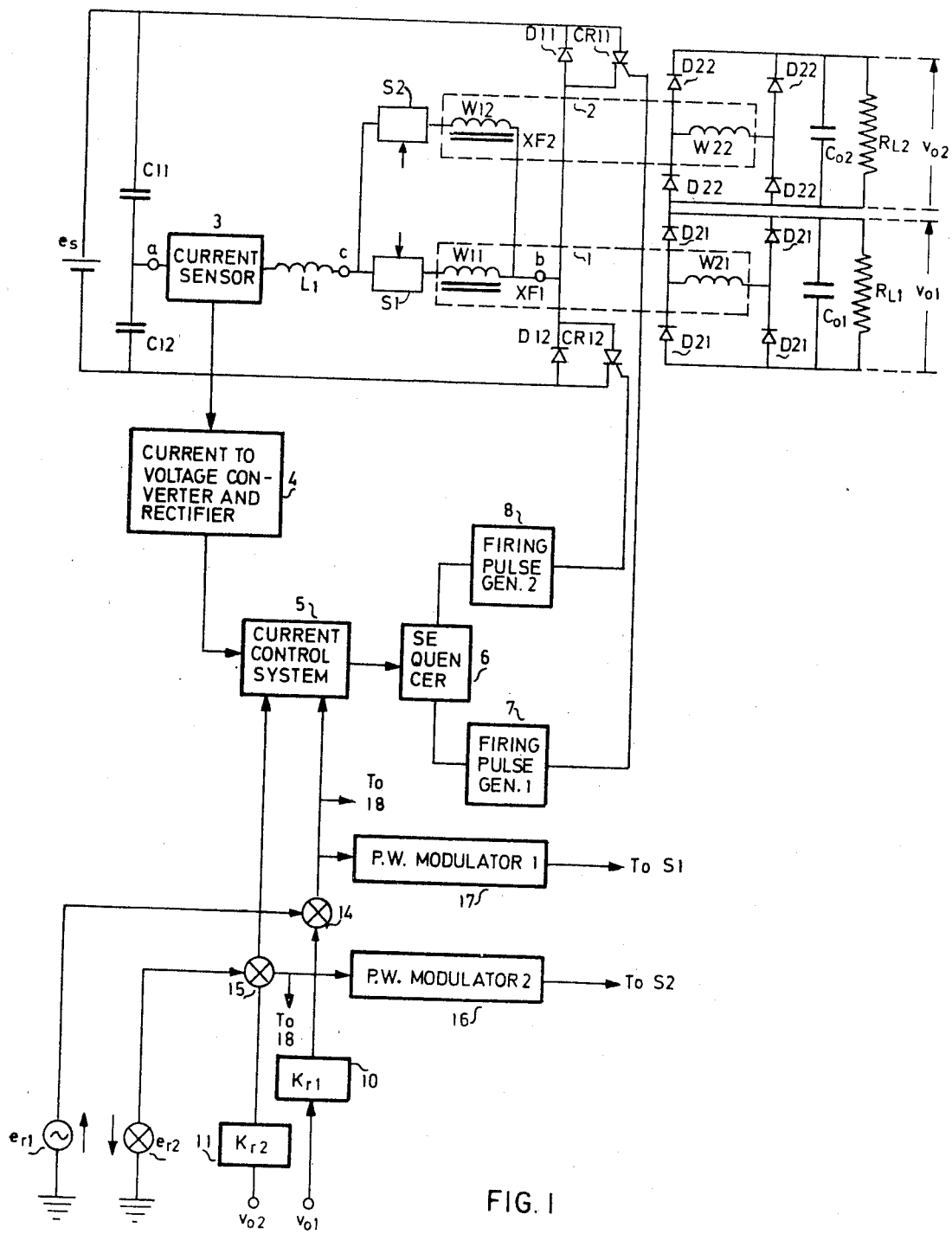
FIG. 1 is the schematic diagram of a frequency modulated series capacitor inverter-converter governed by a control system for controlling the energy exchange between a source of electric energy and plural loads through a series resonant circuit, FIGS. 2(a), (b) and (c) indicate one form of the individual control of loads by the system which is conceptually presented in FIG. 1.

In the drawings, inductors, capacitors, diodes, controlled rectifiers and resistors are designated by conventional symbols and by reference characters L, C, D, CR and R with various subscripts. In the specification and claims the reference characters for inductors, capacitors, controlled rectifiers and resistors may also be used as algebraic symbols to represent the inductance in Henrys, the capacitance in Farads, and the resistance in Ohms of the several parts. In each case the sense of the usage will be clear from the context.

This invention will be described as it is applied with a series capacitor inverter-converter as shown in FIG. 1 and will be, primarily, discussed with reference to two independently controlled DC output voltages. The presented method can be extended to more than two independently controlled DC output voltages, as obvious to those skilled in the art. Furthermore, the input voltage which is shown here as a DC voltage can assume any form as described in the above referred to U.S. Pat. No. 4,096,557. Furthermore, two or more independently controlled loads can be incorporated in four quadrant AC and DC to AC and DC converters employing series resonant circuits, as described in U.S. Pat. No. 4,096,557. Yet furthermore, the circuit configuration of FIG. 1 can be modified from a one half bridge to a full bridge form, energized from two or more AC or DC sources terminals. Pertinent background knowledge is partially contained in the above cited U.S. Pat. Nos. 3,953,779 and 4,096,557, and my copending patent application Ser. No. 43,882 filed May 30, 1979. Further material may be found in a text by Bedford, B. D. and Hoft, R. G., "Principles of Inverter Circuits", Wiley, N.Y., 1964.

Referring to the drawings and specifically to FIG. 1, the primary part of the power circuit of the frequency modulated series capacitor inverter-converter is exactly the same as U.S. Pat. No. 3,953,779, except for the addition of a second output power transformer XF2, which is located in parallel with output power transformer XF1. A primary winding W11 of the transformer XF1 and a primary winding W12 of the transformer XF2 are respectively connected to the primary circuit of the converter. Each of the two primary transformer windings W11 and W12 is connected to the point c-b of the resonant circuit individually by way of two controllable switches S1 and S2, respectively. The primary winding W11 is only connected to the primary converter circuit if switch S1 is closed. The primary winding W12 of the power transformer XF2 is only connected to the primary circuit of that converter if switch S2 is closed.

Whenever any of the two switches S1 or S2 is open, then the associated primary winding of the power transformer XFi (i=1,2) is not connected to the series resonant circuit. It is intended that at least one of the two switches S1 and/or S2 is closed at given time. The significance of these switches will emerge more clearly from the further presentation of the material of this specification.

The transformer XF1 has a secondary winding W21 and is enclosed by a dashed line 1. The transfer XF2 has a secondary winding W22 and is enclosed by a dashed line 2. The first of the indices following the letter W is meant to identify the function of the winding, where the index 1 designates a primary winding and 2 designates a secondary winding. The second of the indices of the W is meant to identify the order number of the transformer which corresponds to the single index used after the letters XF. Accordingly the symbol of W21 designates the secondary winding of the power transformer XF1.

Each of the said secondary windings of the power transformers XFi is enclosed by a full rectifier bridge of diodes D2i (i=1,2). Each of the output means or terminal pairs of said S1 rectifier bridge is connected a filter capacitor $C_{oi}$ (i=1,2), in parallel with resistive load $RL_i$ with the meaning of the index i, as indicated above.

The above described converter power circuit is identical with that of the power converter described in U.S. Pat. No. 3,953,779 when only one of the switches S1 or S2 is in the closed position.

The control system which is presented in the form of a block diagram below the power circuit depicted in FIG. 1 is identical with the control circuit described in U.S. Pat. No. 3,953,779 when only one of the primary windings of the W1i of the transformers XFi is connected to the circuit by way of a single closed switch Si. However, the present control circuit includes plural pulse width modulators shown as PW MODULATOR 1, and PW MODULATOR 2, illustrated within the boxes 17 and 16, respectively.

If both switches S1 and S2 are closed, then both output voltages $V_{o1}$ and $v_{o2}$ are applied to attenuators $k_{o1}$ and $k_{o2}$ shown in boxes 10 and 11 and in conjunction with the reference sources $e_{r1}$ and $e_{r2}$ to provide inputs to comparators 14 and 15 respectively. The effect of the output of the comparators 14 and 15 on a Current Control System 5 is such that the current $i_1$ in the series resonant circuit is reduced when $v_{oi}k_{oi} > e_{ri}$ and otherwise not affected when $v_{oi}k_{oi} < e_{ri}$. Accordingly, each of the outputs of the comparators 14 or 15 will individually limit the supply of current in the series resonant circuit of the power converter whenever the corresponding output exceeds a voltage $v_{o1} > e_{ri}/k_{o1}$. The control of the series resonant current when multiple output is desired will be explained with reference to the pulse width modulators PW MODULATORS i, (PWMi), 16 and 17 in FIG. 1.

Figure 2:
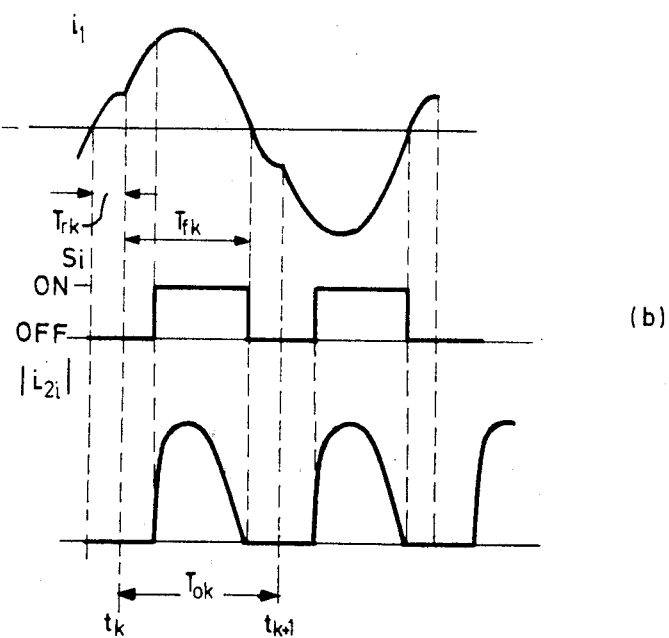
Figure 2:
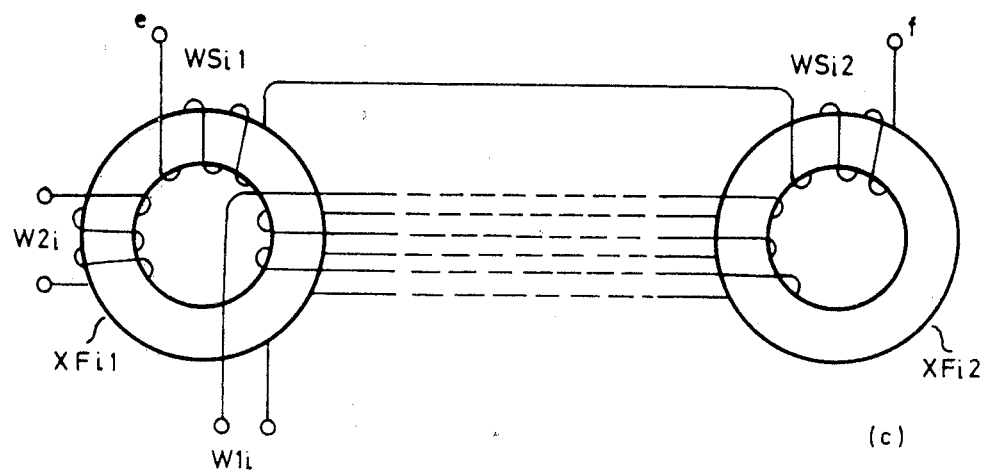

The PWMi 16 and 17 are controlled by the outputs of the comparators 14 and 15 respectively. Whenever $v_{o1}k_{o1} = e_{r1}$, then the PWM1 will emit pulses that correspond to the entire width of one pulse with time length $T_{ok}$, as illustrated in FIG. 2(b). The PWM1 assumes the function of the switch S1 of FIG. 1 and manifests itself in the form of the signal Si in FIG. 2(b), or S1 in this example. If $v_{o1}k_{o1} > e_{r1}$, then the pulses S1 will narrow with increasing said inequality. It should be apparent to those skilled in the art that only a fraction of the current $i_1$ is transferred to the output of the transformer XF1 and the voltage $v_{o1}$ starts to decay. Decreasing $v_{o1}$ will reverse the above described process and cause an increase of $v_{o2}$.

An analogous process takes place by the interaction of $v_{o2}$, $k_{o2}$, $e_{r2}$, comparator 15, PWM2 and XF2. The two output voltages $v_{o1}$ and $v_{o2}$ are, therefore, individually controlled. Only the higher voltage of the two output voltages will have an effect on the Current Control System 5 to reduce $i_1$. When both output voltages $v_{o1}$ and $v_{o2}$ are at the value required by the reference sources $e_{ri}$, the current $i_1$ has to assumes a value such that the two loads obtain required voltages. A state of equilibrium is therefore reached in which the resonant current $i_1$ assumes the needed value and the power is divided between the transformers with each load having its required voltage value.

Conversely, an analogous argument can be made to provide each load with a current of a nominal value as required by individual reference sources $i_{ri}$ as analogy to the reference sources $e_{ri}$ for the control of output voltages. The process for an implementation of two independently controlled current sources, or any combination of voltage and current control analogous to the above described process can be implemented by those skilled in the art.

An extension of the above described procedure of independent control of more than two loads can be devised by the extension of the aforesaid described procedure by those skilled in the art.

The explanation of individual load control was presented with the use of the concept of pulse width modulation but it should be understood that any other form of pulse modulation can be applied for that purpose as well known by those skilled in the art.

Figure 2A:
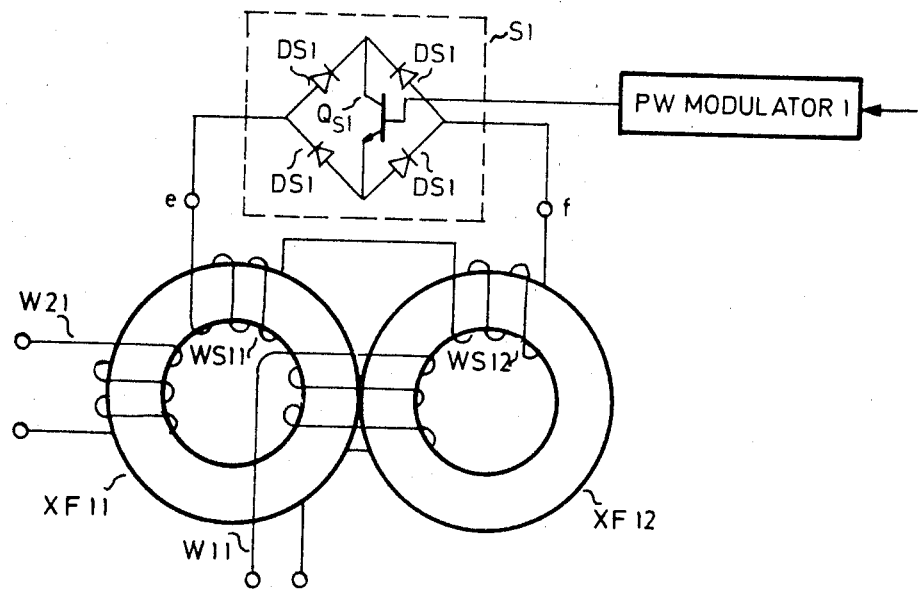

The description of one form of implementation of the above described method of control is explained with reference to FIG. 2(a). The transformer XF1 comprises two magnetic cores XF11 and XF12. The primary winding W11 encloses both magnetic cores XF11 and XF12. The secondary winding W21 encloses only the core XF11. An auxiliary winding WS11 encloses core XF11 and continues as winding WS12 to enclose core XF12 and terminates in the open terminals e and f, as shown in FIG. 2(a).

The two terminals e and f are connected by switch S1, comprising a full wave rectifier bridge, including diodes DS1. The output of the rectified bridge is connected to a transistor $Q_{S1}$ which is used to short circuit or open the output terminals of the rectifier bridge. The transistor $Q_{S1}$ is energized by the pulse width modulator PW MODULATOR 1, illustrated as 17 in FIG. 1. The output of PWM1 is indicated as waveform Si in FIG. 2(b). When Si is ON, then $Q_{S1}$ closes. Whenever Si is OFF, then $Q_{S1}$ opens. Switch S1 of FIG. 2(a) is open when signal Si in FIG. 2(b) is OFF and vice versa.

When the primary winding W11 is energized and switch S1 is open, then all magnetic flux change will take place in the core XF12 because no load is connected to a winding enclosing the core XF12 alone. Yet, winding W21, which encloses the magnetic core XF11, is loaded by the load $R_{L1}$ as indicated in FIG. 1. It follows that no energy will be transferred from the primary winding of the transformer XF1 to the secondary winding W21, as long as switch S1 is open. When switch S1 of FIG. 2(a) is closed by way of energizing transistor $Q_{S1}$, then the electric circuit comprising the windings WS11 and WS12 is closed. The polarity of these windings is such that the magnetic flux energizing winding WS12 transfers energy to the core XF11 to add to the energy transferred from winding W11 to winding W21. This secondary winding W21 is now fully energized from the primary winding W11, with some of the energy being transferred via the core XF12 as long as switch transistor $Q_{S1}$ and therefore switch S1 are closed.

The interaction of the switch S1, the PWM1 and the remainder of the system was explained above. Another form of implementation of the "switching transformer" of FIG. 2(a) is to short circuit and release the winding WS12 with switch S1 and remove the winding WS11. The magnetic flux change in the magnetic core XF12 is then arrested or freed, as required and practically all energy is transferred between winding W11 and winding W21.

FIG. 2(c) illustrates a transformer XF with an unspecified number of controllable output channels, which is derived by induction from the "switching transformer" illustrated and explained above with reference to FIGS. 2(a) and 2(b). An expansion of the above explained principle should be apparent to those skilled in the art.

Figure 3:
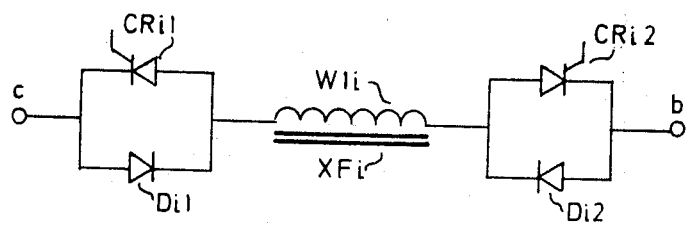
FIG. 3 presents yet another form of implementation of the system indicated in FIG. 1 and FIGS. 4(a) through 4(d) indicate the preferred embodiment for the implementation of the conceptual system as indicated in FIG. 1.
Figure 4:
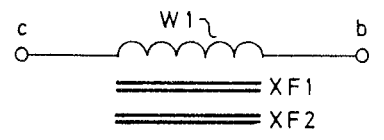
Figure 4:
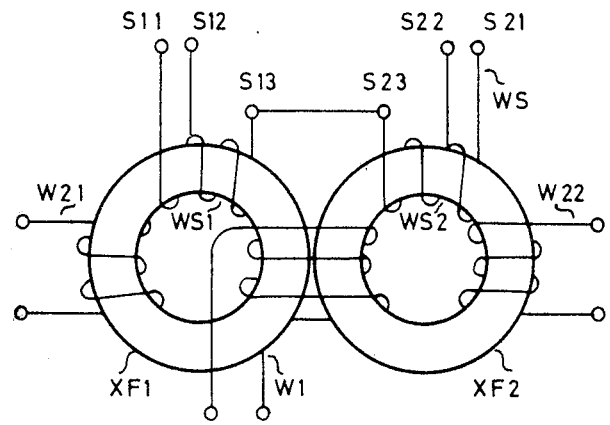
Figure 4:
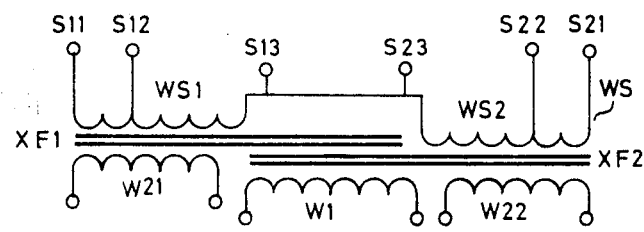
Figure 4:
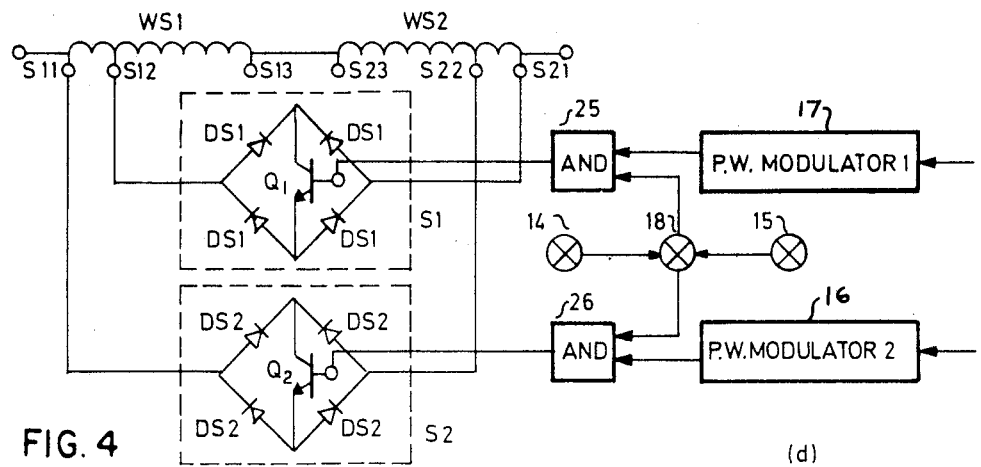

A simpler form of independent load control is illustrated in FIG. 3. A transformer XFi is connected to a resonant circuit, using the control principle for multiple load operation as explained above with reference to FIGS. 1 and 2. The switch Si is now embodied by the thyristors CRi1 and CRi2. The diodes Di1 and Di2 are used to close the respective circuit. A load can also be connected via the above described switches to the resonant circuit without the interposition of a transformer. Any combination of antiparallel controlled bridges or polyphase connections, as described in U.S. Pat. No. 4,096,557 can be used with this configuration.

Another implementation of control of energy transfer to two loads is illustrated in FIGS. 4(a) through 4(d). The two cores of the transformers XF1 and XF2 are now simultaneously enclosed by one single primary winding W1. The core XF1 is also enclosed by a secondary winding W21. The core XF2 is also enclosed by a secondary winding W22. If the magnetic cores are equally loaded by the windings W21 and W22, respectively, then the power entering through winding W1 will be equally distributed to the respective connected loads $R_{L1}$ and $R_{L2}$. If the above described equilibrium of the loads is disturbed, then a modification of the division of power supplied by the winding W1 to the two said transformer cores becomes necessary in order to maintain the desired voltages on the loads $R_{L1}$ and $R_{L2}$.

The desired division of power transfer through the cores XF1 and XF2 is caused by connection of two auxiliary windings, namely winding WS1 enclosing core XF1 and winding WS2 enclosing core XF2. These windings WS1 and WS2, respectively, have taps so that the number of turns around XF1 is larger or smaller than those around XF2, when these two windings WS1 and WS2 are connected to each other by way of a switch. For the simplicity of argument it is assumed here that the cores XF1 and XF2 have the same cross-section, an assumption which is not requesite for the implementation of the transformer, described with reference to FIG. 4.

The above described transformer is illustrated in FIGS. 4(a) and 4(b). An electric diagram of FIG. 4(c) elucidates the intended windings, cores, and their functional position with respect to each other. FIG. 4(d) illustrates the intended use of this transformer. If more power should be diverted to the winding W22 than winding W21, then less turns of the winding WS1 are connected to more turns of the winding WS2 by way of switch S1. This is caused by energizing transistor $Q_1$ which closes the above described circuit. The transistor $Q_1$ is energized by an AND gate 25 which requires two inputs. The first input is received from discriminator 18 which registers the difference in output of the comprators 14 and 15 of FIG. 1, thus indicating which of the two loads is in need of less power. The degree of unbalance is determined by the PW MODULATOR 1 designated by 17, provides the second input the function of which has been described above with reference to FIG. 2(b).

Conversely, if winding W21 is in need of more power, then the other output of the discriminator 18 will energize the AND gate 26 and the PW MODULATOR 2, designated by 16, will energize the transistor $Q_2$ and thus close intermittently the switch S2. Now less turns enclosing XF2 are connected to more turns enclosing XF1 and the flow of power from the common winding W1 is increased toward the winding W21, feeding the load $R_{L1}$.

The above process of individually controlled power transfer can be extended to three or more loads using the above explained principle, by those skilled in the art.

Any combination of the processes described with reference to FIGS. 1, 2, 3 and 4 may be interchanged or incorporated into my prior invention cited above. These applications and extension are accessible to those skilled in the art, as is the use of half and full bridge configurations.

What is claimed is:

1. A converter circuit for transferring electrical power between circuit input means and first and second circuit output means, comprising in combination:
   capacitor means;
   inductor means;
   controllable resonant circuit switch means;
   means connecting said capacitor means and said inductor means and said controllable resonant circuit switch means for forming series resonant circuit means to transfer electrical power between the circuit input means and the first and second circuit output means through resonant oscillation in said series resonant circuit means;
   control means connected to said controllable resonant circuit switch means for controlling the transfer of the total electrical power transferred between the circuit input means and the first and second circuit output means; and
   first controllable switch means connected for controlling the transfer of electrical power through the first circuit output means.

2. A converter circuit as set forth in claim 1, including second controllable switch means connected for controlling the transfer of electrical power through the second circuit output means.

3. A converter circuit as set forth in claim 1, including transformer means interposed in the converter circuit for coupling said series resonant circuit means to the first and second circuit output means.

4. A converter circuit as set forth in claim 1, including first and second transformer means interposed on the converter circuit for coupling said series resonant circuit to the first and second circuit output means, respectively.

5. A converter circuit as set forth in claim 2, including first and second sensing means for sensing the voltage on the first and second output means; and
   said control means receiving the signal from said first and second sensing means and connected to said first controllable switch means for controlling the power through the first output means.

6. A converter circuit as set forth in claim 5, including third sensing means for sensing the voltage on said capacitor means; and
   said control means receiving the signal from said third means for controlling the total power transfer through the first and second output means by control of said controllable resonant circuit switch means.

7. A converter circuit as set forth in claim 1, wherein said first controllable switch means comprises plural unidirectional switch means established for opposed current flow; and
   plural unidirectional means established in parallel with said unidirectional switch means for enabling controlled bilateral current flow.

8. A converter circuit as set forth in claim 1, wherein said first controllable switch means includes a transformer having a first and a second transformer core;
   a primary winding established about said first and second transformer cores;
   a secondary winding established about only one of said cores;
   a switching winding encompassing each of said first and second cores of said transformer; and
   a solid state switch interconnecting the terminals of said switching winding enabling energy transfer from said primary winding to said secondary winding when said solid state switch is closed and for inhibiting energy transfer from said primary winding to said secondary winding when said solid state switch is open.

9. A converter circuit as set forth in claim 2 wherein each of said controllable switch means include a transformer having a transformer core;
   a primary winding established about said first and second cores;
   a secondary winding established about each of said cores for providing the first and second output means; and
   a switching winding having winding taps encompassing each of said cores for cooperation with solid state switch means for varying the output among said secondary winding.

10. A converter circuit for transferring electrical power between circuit input means and a plurality of circuit output means, comprising in combination:
    capacitor means;
    inductor means;
    controllable resonant circuit switch means;
    means connecting said capacitor means and said inductor means and said controllable resonant circuit switch means for forming a series resonant circuit means to transfer electrical power between the circuit input means and the plurality of circuit output means through resonant oscillation in said series resonant circuit means;
    control means connected to said controllable resonant switch means for controlling the transfer of the total electrical power transferred between the circuit input means and the plurality of circuit output means; and
    output controllable switch means connected for controlling the transfer of electrical power through at least one of the plurality of circuit output means.

11. A converter circuit for transferring electrical power between circuit input means and first and second circuit output means, comprising in combination:
    capacitor means;
    inductor means;
    controllable resonant circuit switch means;
    means connecting said capacitor means and said inductor means and said controllable resonant circuit switch means for forming series resonant circuit means to transfer electrical power between the circuit input means and the first and second circuit output means through resonant oscillation in said series resonant circuit means;
    first and second controllable switch means connected for controlling the transfer of electrical power through the first and second circuit output means, respectively;
    first and second sensing means for determining the voltage on the first and second circuit output means, respectively;
    third sensing means for determining the voltage on said capacitor means;
    control means for receiving signals from said first, second and third sensing means for controlling the individual electrical power transfer through each of the first and second output means by control of said first and second controllable switch means, respectively; and
    said control means controlling the total power transfer through the first and second output means by control of said controllable resonant circuit switch means.

12. A converter circuit as set forth in claim 10, wherein said first and second sensor means comprises:
    a first and a second reference voltage;
    a first and second comparator for comparing the voltage of the first and second output means to said first and second reference voltage, respectively;
    a first and a second pulse modulator receiving the outputs of said first and second comparators for controlling said first and second controllable switch means, respectively.

13. A converter circuit as set forth in claim 11, wherein said control means includes a current control system;
    firing pulse generator means interconnecting said current control system and said controllable resonant circuit switch means; and
    said current control system receiving the output of said third sensor means and the output of said first and second comparators for energizing said controllable resonant circuit switch means in accordance with the current flow in said series resonant circuit and in accordance with the output of at least one of said first and second comparators.

* * * * *

UNITED STATES PATENT AND TRADEMARK OFFICE
CERTIFICATE OF CORRECTION

PATENT NO. : 4,333,135

DATED : June 1, 1982

INVENTOR(S) : Francisc C. Schwarz

It is certified that error appears in the above—identified patent and that said Letters Patent is hereby corrected as shown below:

Column 1, line 27, after "in" insert -- which --.

Signed and Sealed this

Twenth-eighth Day of September 1982

[SEAL]

Attest:

GERALD J. MOSSINGHOFF

Attesting Officer     Commissioner of Patents and Trademarks